United States Patent [19]
Bates et al.
[11] 3,911,419
[45] Oct. 7, 1975

[54] CONTROLLER FOR CURSOR POSITIONING ON A DISPLAY MEDIUM

[75] Inventors: Roger D. Bates, Sunnyvale; Butler W. Lampson, Patola Valley, both of Calif.
[73] Assignee: Xerox Corporation, Stamford, Conn.

[22] Filed: Nov. 23, 1973
[21] Appl. No.: 418,505

[52] U.S. Cl. .......... 340/324 AD; 178/DIG. 6; 355/5
[51] Int. Cl.$^2$ .......... G06F 3/14
[58] Field of Search .......... 340/324 A, 324 AD; 178/DIG. 6; 355/5

[56] References Cited

UNITED STATES PATENTS

| | | | |
|---|---|---|---|
| 2,784,247 | 3/1957 | Hurford | 340/324 AD |
| 3,011,164 | 11/1961 | Gerhardt | 340/324 AD |
| 3,609,743 | 9/1971 | Lasoff et al. | 340/324 AD |
| 3,706,075 | 12/1972 | Frederickson et al. | 340/324 AD |

*Primary Examiner*—Marshall M. Curtis
*Attorney, Agent, or Firm*—James J. Ralabate; Terry J. Anderson; John H. Chapman

[57] ABSTRACT

The present invention relates to the processing of cursor information for the display of a cursor on a display medium. Positional information for the cursor is provided by means of an input device which generates signals that are received by a control element which converts this information into cursor video signals to provide the cursor display. The cursor control element processes the vertical and horizontal position coordinate information such that the cursor displayed is independent of any characters being displayed on the medium.

18 Claims, 6 Drawing Figures

CONTROLLER FOR CURSOR POSITIONING ON A DISPLAY MEDIUM

BACKGROUND OF THE INVENTION

This invention relates to a device for producing a cursor for display from input positional information, and more particularly to such a device for processing such positional information to provide a cursor on a display medium in accordance with positional displacements on the medium independent of any characters being displayed.

A conventional display system may include a cathode ray tube monitor as the display medium. The information to be displayed is derived from the conversion of raw data into information that is compatible with visual presentation. The input data may either be digital or analog, which may also include data entered into the system by means of an input device. Such input devices may be a light pen or even a digital pointing device, such as a joy stick, a "mouse," or the like. Such input devices provide a movable display symbol or cursor editing or otherwise varying the character information displayed by the monitor. The output of these input devices provides positional signals which are processed for the production of the cursor display. In prior art devices, the cursor is constrained to character positions on the screen. For example, in U.S. Pat. No. 3,739,347 the address of a cursor intersection corresponds with the coordinate address of the character information located at the same point on the display. Thus, the source of the character information is actually determinative of the positioning of the cursor on the display medium.

It is an object of the present invention to provide a cursor which is freely movable on the display medium.

Another object of the present invention is to provide a cursor which is independent of the character information being displayed.

Still another object of the present invention is to process positional signals from an input device such that a cursor display is provided independent of any character information being displayed.

Other objects of the invention will be evident from the description hereinafter presented.

SUMMARY OF THE INVENTION

The invention provides a device for processing positional information from an input device to produce a cursor on a display medium. Specifically, the positional information is processed by a cursor control device which includes a cursor memory for storing the cursor character and additional logic elements for generating cursor video depending upon the information in the memory and the positional information received by the device. The device further includes horizontal and vertical counters which receive the vertical and horizontal position coordinates, respectively, from the input device. The control device is also receptive of the horizontal and vertical blank signals which control the scanning beam which produces the display raster. The positional coordinate information is processed such that a cursor is displayed on the screen independent of any character information restrictions.

Another feature of the invention is that when the cursor is on top of a character and there is a conflict in intensity of color, the intensity in color chosen for the cursor override. As the cursor is freely moved about the display medium, its background will match that of the screen on which it is displayed.

The cursor character may be any shape by design; however, in this preferred embodiment it is represented by a rectangle. This cursor character will begin to be displayed when the X and Y coordinates of the scanning beam as determined by the horizontal and vertical counters match the cursor coordinates. This coordinate match determines the upper left hand corner of the rectangle constituting the cursor character.

These and other features which are considered to be characteristic of this invention are set forth with particularity in the appended claims. The invention itself, however, as well as additional objects and advantages thereof, will best be understood from the following description when considered in conjunction with the accompanying drawings.

DESCRIPTION OF THE PREFERRED EMBODIMENT

Figure 1:
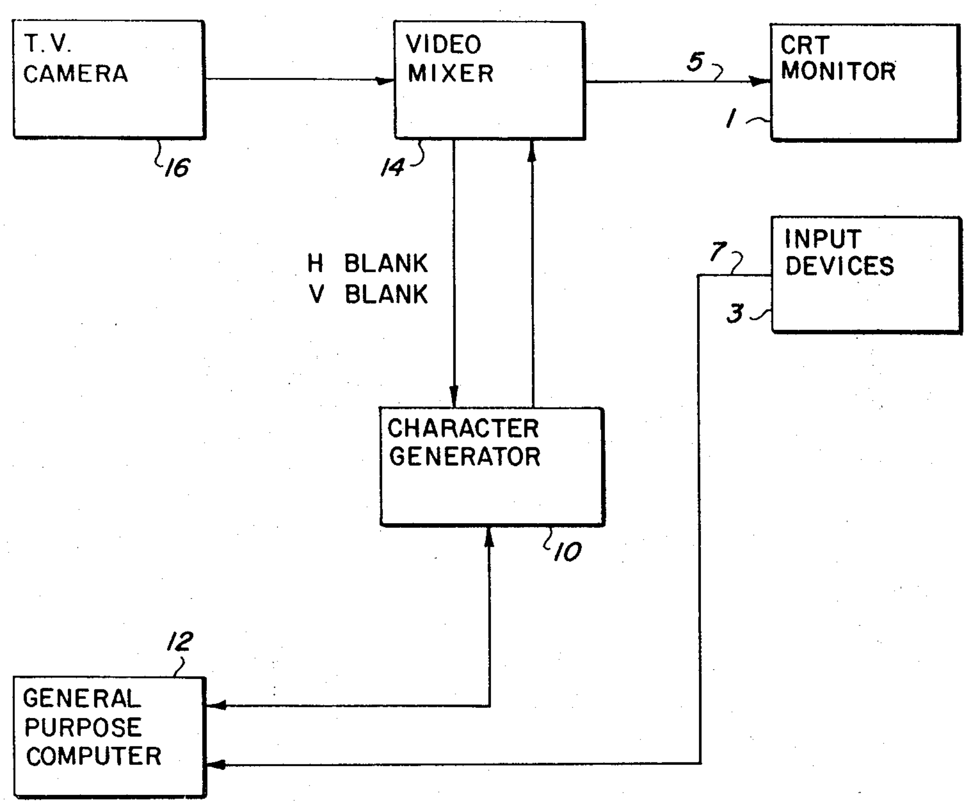
FIG. 1 is a functional block diagram illustrating the basic elements of a system in which this invention may be employed.

In FIG. 1 is shown the basic elements of the system which converts binary information to a video signal which may be utilized on a display medium. Display media contemplated would include, but not be limited to, television receivers, cathode ray tube display terminals, and electrostatic and graphics printers. In this preferred embodiment, however, it will be assumed that the display medium is a cathode ray tube monitor 1. Any conventional T.V. type CRT terminal which sequentially scans the CRT screen would suffice. For optimum design, the terminal would use a 15-inch, 1029-line monitor oriented vertically in order to produce a video raster consisting of 1209-line horizontal video comprising a display area slightly larger than a standard sheet of 8½ × 11 paper. The display may further be equipped with an independent keyboard, a keyset and an input device 3, such as a digital pointer, for positioning a cursor on the display area. A single coaxial cable 5 for the video signals and three twisted pairs 7 for digital data, i.e., input, output and clock, would connect the terminal to a central site where the character generator 10 and its associated computer 12 are located. If a plurality of terminals were contemplated, the connection would be radial in that each terminal would have its own set of connecting wires. The terminal could even include a collection facility through conventional logic design for accepting input data on the terminal and transmitting it to the controlling computer.

The input device 3 are connected through the line 7 to the computer 12. A general purpose computer suitable for this embodiment is the Data General Nova 1200. The binary output of the computer 12 is connected to the input of the character generator 10 which processes the binary information to generate output video signals. A video mixer 14 receives signals coming from a TV camera 16, processes the synchronizing information which is a part of these signals, and generates a signal called horizontal (H) blank and vertical (V) blank which is transferred to the character generator 10 for synchronizing the video signals generated by the generator 10.

Instead of the T.V. camera 16, one could provide the necessary synchronizing signals from any commercially available synchronizing source. The T.V. camera 16 is also used for providing an external video signal which is used for implementing the feature of selecting external video under display list control in the character generator 10. Alternative sources of external video are tape recorders or other character generators. The video mixer 14 under control of the character generator 10 can selecr either the external video or video from the character generator 10. The video signals processed by the mixer 14 are transferred over the cable 5 to the CRT monitor 1 for viewing.

A display list is assembled in the computer 12, which list constitutes a string of instructions indicating what characters are to be displayed on the screen, at what position the characters are to be displayed, and what kind of modes are to be used. This binary information is transferred to the display list memory 34 where the processing to video information commences. Font information is also assembled and stored in the computer 1 whereupon at some point in time is transferred to the font memory 20, the overlay memory 28, and the font descriptor memory 26.

Figure 3:
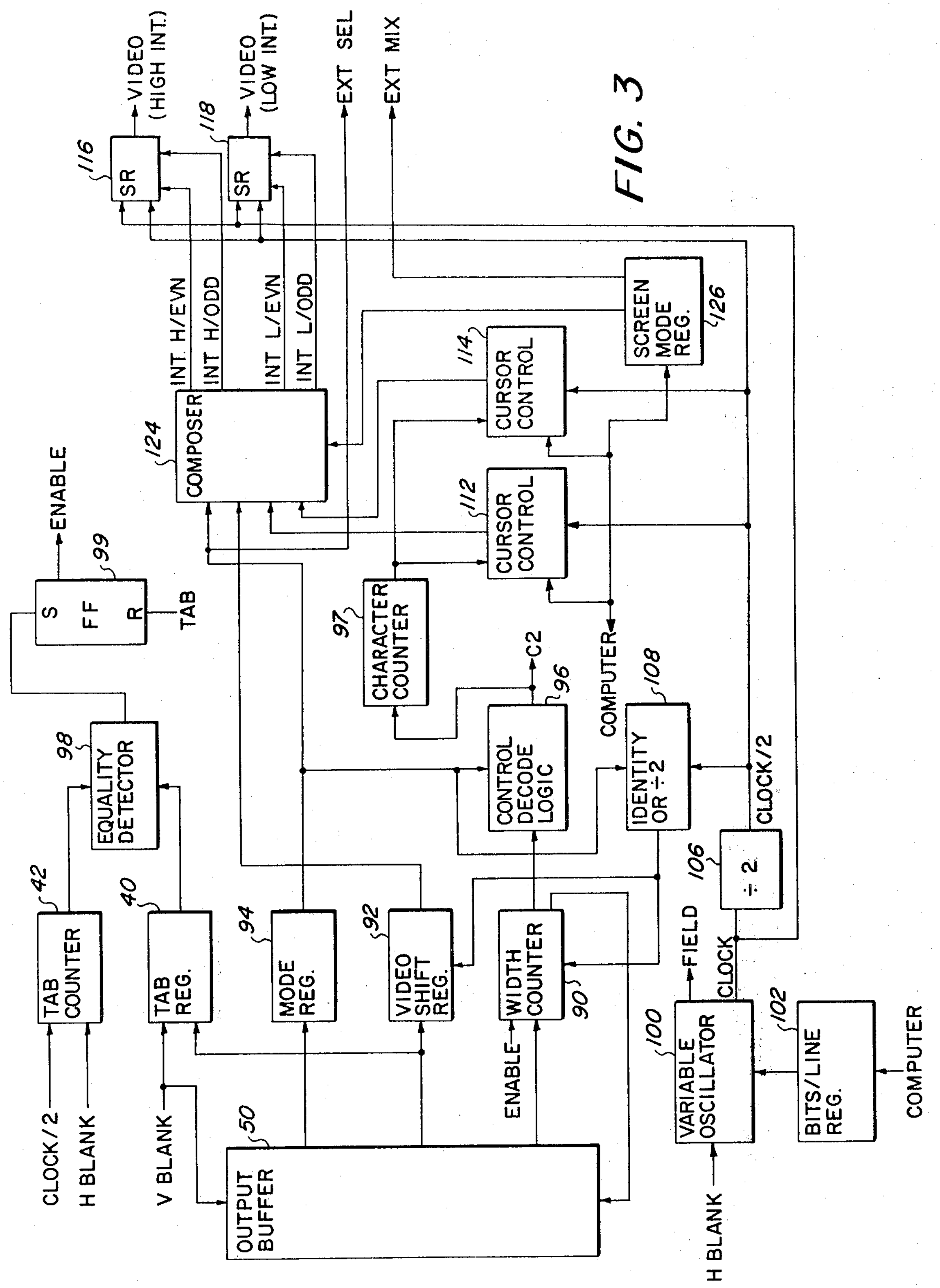
FIG. 3 is a functional block diagram of the video processing elements, including the cursor control device, of the character generator shown in FIG. 1.

Other external information is derived from the signals vertical and horizontal blank and FIELD. The signal vertical (V) blank is inputted to both the program counter 54 and the scan line counter 24. As well, a signal FIELD, which contains T.V. field information from the horizontal (H) blank signal through an oscillator 100 shown in FIG. 3, is inputted to the scan line counter 24. These signals ensure that during vertical blank time, the program counter 54 is cleared to zero and the scan line counter 24 is set to zero or one, depending on the T.V. field.

Figure 2:
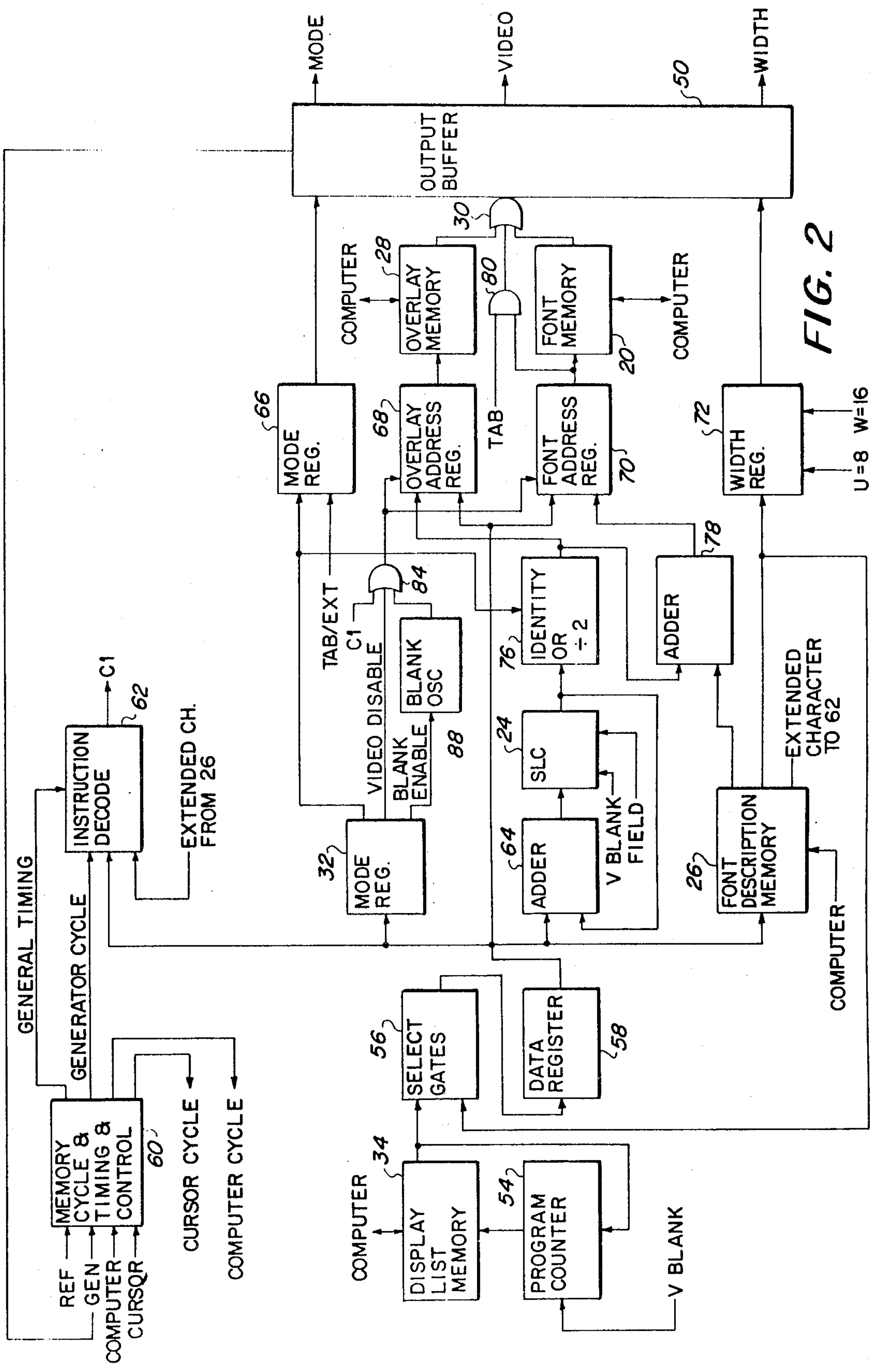
FIG. 2 is a functional block diagram of the display list processor portion of the character generator of FIG. 1.

At the end of vertical blank the character generating elements of FIG. 2 start processing information video output ensures that the video signal will continue to be produced while the processor elements of the system inputted to the buffer 50 are handling jumps, increments, mode changes or characters, which take less than basic memory cycle time to display. This achievement is provided by the particular organization and interrelationship of the processor elements of FIG. 2.

As has already been described, a display list is assembled in the computer 12, which list constitutes a string of instructions indicating what characters are to be displayed on the screen, at what position the characters are to be displayed, and what kind of modes are to be used. This binary information is transferred to the display list memory 34 where the processing to video information commences. Font information is also assembled and stored in the computer 1 whereupon at some point in time is transferred to the font memory 20, the overlay memory 28, and the font descriptor memory 26.

Other external information is derived from the signals vertical and horizontal blank and FIELD. The signal vertical (V) blank is inputted to both the program counter 54 and the scan line counter 24. As well, a signal FIELD, which contains T.V. field information from the horizontal (H) blank signal through an oscillator 100 shown in FIG. 5, is inputted to the scan line counter 24. These signals ensure that during vertical blank time, the program counter 54 is cleared to zero and the scan line counter 24 is set to zero or one, depending on the T.V. field.

At the end of vertical blank the character generating elements of FIG. 2 start processing information generated by cursor logic which is described hereinafter.

The requests, i.e., the refresh, generator, computer, and cursor signals, are ordered by their priority. The highest priority request is the refresh signal. If the character generator 10 makes a request for memory access and there is no refresh request, then the character generator 10 would be given priority. If both the computer 12 and the character generator 10 request memory access, then the character generator 10 will get preference and the computer 12 will be ignored. The cursor request is assigned the lowest priority. The control element 60 generates certain control outputs: general timing and generator cycle signals go to an instruction decode element 62 which coordinates the distribution of control information to other elements within the system; computer cycle signals go to the computer 12 that indicate a memory cycle for the computer is taking place; and cursor cycle signals to the cursor logic that indicate a memory cycle is taking place for the cursor control elements 112 and 114 in FIG. 5.

The memory cycle timing and control circuit number 60 are standard timing circuits for providing the necessary trains of timing signal pulses for transferring data into and through the generator 10. To create the timing pulses, a plurality of one-shot multi-vibrators may be used to produce a series of successive timing pulses that are selected to provide such transfer of data. Memory request information, i.e., refresh, character generator, computer, or cursor memory cycles requests, may be processed by utilizing conventional modules which perform the functions described above.

The instruction decode element 62 is comprised of conventional decoding logic which is employed to produce an output signal C1 that is indicative of a given desired function based upon the inputs to the element 62. For example, a number of AND gates and OR gates may be combined logically to take the binary information stored in the data register 58, determine what kind of instruction is stored there, take that information combined with timing pulses from the control element 60 and generate the output control pulses. As an example, if bit 6 is on and bit 7 is off in the data register 58, then a mode instruction is indicated. This instruction is decoded with an AND gate. The output of the AND gate is then inputted to another AND gate which has as a second input an end of cycle pulse coming from the control element 60. A pulse is thereby generated which is transferred to the mode register 32 to cause the register 32 to be loaded.

When information from location zero in the list memroy 34 is entered into the data register 58, the program counter 54 is incremented by one under the control of the signal C1 from the decode element 62. At this time the program counter 54 has a number 1 in it, and another memory cycle is commencing. With the start of a new memory cycle, information from address 1 of the display list memory 34 is to be processed and the data from address 0 in the data register 58 is to be further processed simultaneously by the character generating elements of the system shown in FIG. 2.

The information in register 58 is further processed upon the determination by the decode element 62 of whether it represents a character for display on the monitor screen or one of the various control type words which have been described as being contained in the display list memory 34. For example, the information could represent a mode change word, a word to modify the scan line counter 24, or perhaps a word to set a TAB. If the register 58 is found to contain a mode change word, then at the end of the next memory cycle the mode information contained in data register 58 is loaded into mode register 32. When information is transferred from the register 32, the data output from the list memory 34 located in address 1 is loaded into the data register 58, the program counter 54 is again incremented and another memory cycle starts. This sequence represents a typical memory cycle.

If the information in the data register 58 had been an "add to the scan line counter," then the information in the data register 58 would have been added through adder 64 along with the current contents of the scan line counter 24. The output of the adder 64 is then added back into the counter 24. The output of the adder 64 represents the sum of its two binary inputs. At the end of the memory cycle, the decode element 62 will generate a control pulse C1 which is transferred to the scan line counter 24 to load a new value. The new value of the counter 24 will be the sum of its present value and contents of the data register 58. The control signal C1 represents a connection between the decode element 62 and the information processing elements of FIG. 2. C1 represents load and increment signals to the program counter 54 at the appropriate times. C1 also represents switching the select gates 56 to select between the output of the display list memory 34 for normal instruction or the output of font descriptor memory 26 for an extended character. It further represents control to the data register 58 to receive the information from the select gates 56 at the end of each memory cycle which requires it. It represents control to load the contents of register 58 into the mode register 32 if the data register 58 contains a mode change word, to load a new value into the scan line counter 24 at the end of a memory cycle if the data register 58 contains the appropriate instruction. Additionally, C1 represents control to load new information into a mode register 66, overlay address register 68, font address register 70, and width register 72, if the data register 58 contains a normal character to be displayed. The registers 66, 68, 70, and 72 are loaded simultaneously when the data register 58 contains a character word.

In the situation of a normal character to be displayed, at the end of the next memory cycle the character address of the word contained in the register 58 is loaded into the character portion of the font address register 70. Any overlay bits are loaded into the overlay address register 68. Information from the counter 24 is also loaded into the overlay address and font address registers 68 and 70 at this time if required. An overlay address is a combination of the particular overlay character consisting of three bits of information and the pointer to the vertical position within the overlay character being processed.

The information from the counter 24 represents the contents of the scan line counter 24 either directly or divided by two which is a function of the element 76 under the control of the mode register 32. The choice of identity or divide by two indicates whether or not the character is to be scaled vertically times two or not. If it is not scaled, then an identify address is transferred. If it is scaled by two, i.e., twice its normal height, then the value of the scan line counter 24 is divided by two and is transferred into the overlay address register 68. The functions of the element 76 may be provided by a 74157 TI module.

Control of the element 76 by the mode register 32 is provided by a select signal resulting from a binary digit (bit) in the mode register 32 indicative of the last time the mode register 32 was loaded from the data register 58 from the list memory 34. Thus, the register 58 is actually under display list control to set a bit in the mode register 32 to vertically scale a character or not.

Similarly, the address for the font address register 70 is derived from contents of the scan line counter 24 through element 76 either directly or divided by two. In addition, the output of element 76 is applied to the input of an adder 78 having two inputs: the scan line count from the element 76 and vertical offset information as contained in the font descriptor memory 26. The offset information consists of three bits which are used to subtract a number from the scan line count for generating a resultant output that is transferred to the font address register 70. By subtracting a number, a character is effectively moved vertically up the screen (displaced). Therefore, a vertical offset is performed by subtracting some number assigned by the font descriptor of the memory 26. The font descriptor memory 26 contains at this time the font description for the appropriate character since the address input to the font descriptor 26 is the character address as contained in the data register 58.

Additional outputs of the font descriptor memory 26 are either width or extension information. The width information is both transferred to the width register 72 as width information or back through the select gates 56 to data register 58 as a new character, that is, the extension of the character being processed. The feedback from the descriptor memory 26 actually produces the extension of a character within the register 58. A bit within the descriptor memory 26 indicates whether or not there is to be an extension, which is represented by an extended character signal to the decode element 62.

The width information now stored in the width register 70 contains the designated width for a character.

For special characters, if the font descriptor of memory 26 indicates an extended character is being processed, then the width register 72 will not be loaded with width information from the memory 26. Instead, it will be loaded with a constant *w*, i.e., a value to indicate a width of 16. If a TAB instruction is contained in the data register 58, then another procedure is operational. For example, the width register 72 is forced to contain another constant *u*. In this preferred embodiment, the width of a TAB *u* is eight. TAB is a quasi-character which has been previously discussed in principle and is to be processed differently than a true character.

The values *u* and *w* are derived from the implementation of the width register 72. The width register 72 is an integrated circuit (74298 TI) which contains both four bits of memory and four bits of select gates. An input to the width register 72, either the output of the font descriptor memory 26 or another input to the register 72 simply tied to a ground potential or left floating, is selected to indicate ones or zeros to cause a value indicative of the width *u* or *w* to be loaded into the width register 72.

If a TAB character is being processed, then the TAB value held in the data register 58 is loaded into the character address of the font address register 70. At the same time, a bit in the mode register 66 is set which indicates that character being processed is either a TAB or an extension. This bit is used in conjunction with the value in the width register 72 to direct the particular processing of a character, depending upon whether it is a TAB or an extension. A TAB character is being processed if a tab extension bit is set and a value of eight is in the width register 72. On the other hand, an extended character is being processed if the tab extension is set and a width of 16 in the width register 72. Thus, TAB and extensions are processed as characters while indicating by means of the tab extension bit that they are special characters.

The addresses of characters or special characters thus stored in the font and overlay address register 70 provide the accessing of the font and overlay memories 20 and 28, respectively. The base character and the overlay character accessed in memories 20 and 28 are thereby selected for display and read out of their respective memories to their respective inputs to the OR gate 30 for providing video information to the buffer 50.

An additional source of information to the buffer 50 is the output of the font register 70 directly gated through an AND gate 80 which is ORed along with the outputs from the memories 20 and 28 to the OR gate 30. This third source of information through the gate 30 is only operational during the processing of a TAB character. Upon the incidence of a TAB input to the AND gate 80, the TAB value stored in the register 70 is gated through to provide TAB information to the buffer 50. This information is stored in the buffer 50 in lieu of any video information as, at the same time, any video output from the memories 20 and 28 is inhibited.

The addresses stored in the overlay address register 68 and the font address register 70, respectively, contain a control bit to indicate that the scan line count address is invalid and that the overlay memory 28 or the font memory 20, respectively, should return zeros. One condition of an invalid address is that the scan line count value entered into the registers 68 and 70 are too large, i.e., greater than the defined character matrix. Since overlays are always 32 scan lines high, if the scan line count value entered into the register 68 presents an address which is greater than 31, the control bit is set to indicate an invalid address. If the address in the font address register 70 is greater than 31, a similar indication is made if the control bit in the register 70 is set to indicate that the font memory 20 should return zeros. In this way, invalid addresses are not allowed to be processed into video signals.

These two control bits, contained in the addresses of registers 68 and 70 respectively, perform additional functions. If the data register 58 contains a TAB, then a control signal C1 is generated from the decode element 62 to set the control bits in both the overlay address register 68 and the font address register 70 to force zeros to be returned from the memories 28 and 20 in the next memory cycle. The signal also sets a bit in the mode register 66, at the same time, to indicate a video disable signal which inhibits the processing of video information even though the character is defined. The video disable signal is gated through an OR gate 84, along with the signal C1, and presents the invalid address bit in the registers 68 and 70, respectively.

Mode register 32, in this preferred embodiment, contains a bit to indicate that the character is to be blinking, and if such is indicated by a blink enable signal ORed with the video disable and C1 signals, the bit enables a blink oscillator 88 to alternatively disable or not the control bits in registers 68 and 70, depending upon whether the blink oscillator 88 is on or off. The oscillator 88 may be a one-shot multivibrator such as a Fairchild 9601 device. Therefore, any one of these three signals, i.e., C1, video disable, and blink enable, can cause the output of the OR gate 84 to go high to set the control bits in the overlay address register 68 and the font address register 70 to disable the respective outputs from the overlay memory 28 and the font memory 20 during the next memory cycle.

At the same time, the registers 66, 68, 70, and 72 are loaded the next character is being processed. The new information relating to it stored in the data register 58 is examined by the decode element 62 to advance its processing through another cycle to storage in the registers 66, 68, 70 and 72. At the same time the registers 66, 68, 70 and 72 are being loaded with new information, the output buffer 50 is being loaded with the previous character, i.e., the contents of mode register 66 is loaded into the output buffer 50; the output of any video or TAB information, whichever is gated through OR gate 30, is loaded into the output buffer 50; and the contents of the width register 72 is loaded into the output buffer 50.

Thus, for a character to be completely processed, a display list memory cycle, a data register examining cycle, a font memory access cycle are necessary. While processing a given character involves three memory cycles, a new character is processed every memory cycle because the system elements in FIG. 2 are operating independently and simultaneously of one another. This processing of characters herein described gives an extremely high throughput and yet allows for complex processing necessary for a very high resolution character display.

In FIG. 5, is shown the video processor portion of the character generator 10. The processing elements of FIG. 5 process width, video, and mode information which is read on a first-in — first-out basis out of the buffer 50. Width information is loaded into a width counter 90, video information into video shift register 92, and mode information goes into a mode register 94. The mode information corresponds to information which was originally derived from the mode register 32 and processed through to the output buffer 50. The information stored in the width counter 90 which defines a value or state used to control the operation of a control decode logic circuit 96. The value in the width counter 90 is fed back into the output buffer 50 to control the timing of reading and writing of this buffer. When the state of the width counter 90 goes below a certain value, e.g., four, counter 90 makes a new request for information from the output buffer 50. When the counter value goes to zero, then the new information which is available on the output of the buffer 50 goes into the counter 90, shift register 92, and mode register 94.

When a character is read from the output buffer 50, its associated video information is actually loaded into two shift registers constituting the register 92. With 16 bits of video, two eight-bit-long shift registers are utilized. Beginning with the first bit, every odd bit is stored in one of the shift registers and the alternate, or even bits, are stored in the other shift register. The two shift registers are operated in parallel to process the odd and even bits simultaneously.

The control circuit 96 controls whether the video output information from the buffer 50 is loaded into the shift register 92 or, alternatively, the tab register 40. When the width count of the counter 90 goes to zero, the circuit 96 determines from this condition and the value stored in the mode resister 94 whether the next character to be read from the output buffer 50 is an actual character, the extension of a character, or a tab character. If it is an actual character for display, then the circuit 96 generates a control pulse C2 to load the video shift register 92 with the video output of the buffer 50. If the next character is a tab character, a different C2 pulse is generated to load the tab register 40 with the video output information. If the character is an extension, then the pulse C2 is still generated to load the video shift register 92.

When a pulse C2 is generated for the first two control functions, it is also inputted to a character counter 97 where a count of characters is maintained as characters are loaded into the shift register and cleared when the tab register 40 is loaded. In the case of a character extension, the pulse C2 is inhibited from going to the counter 120. Therefore, the counter 97 keeps track of the number of characters that have been processed since the last tab character.

The control circuit 96 is comprised of conventional decoding logic which is employed to produce an output signal C2 that is indicative of the above desired functions based upon the input signals to the circuit 96. For example, a number of AND gates and OR gates may be combined logically to take the input signals to the circuit 96 to generate the appropriate C2 signals. The width counter 90 may be implemented by a module 74161 TI which includes a chip having an overflow output that indicates a width of 0. Thus, when the counter 90 goes to zero, the overflow signal is ANDed within the circuit 94 with the tab extension bit, inputted to the circuit 96 from the mode register 94, to determine whether the character information being read out of the buffer 50 is a TAB, an extension, or a simple character. Upon the incidence of the clock/two pulses, the appropriate C2 pulses are generated from the decode circuit 96.

The information from the output buffer 50 is processed differently if it represents a TAB. The TAB extension bit stored in the mode register 94 signals the control logic element 96 that TAB information is being read out of the buffer 50. The control signal C2 generated from the element 96 will inhibit the loading of information into the shift register 92 leaving it empty to shift out blank video signals. The information otherwise loaded into the register 92 is loaded into the tab register 40 as the new TAB value, and the flip-flop 99 is reset to zero thereby turning off the enable signal, which is fed back to the width counter 90, stopping the width counter 90 from functioning. As long as the flip-flop 99 is reset, the width counter 90 does not count, and the output buffer 50 will not be accessed for new information. Since the loading of the shift register 92 depends on the output of the counter 90, the shift register is forced to shift only zeros upon this conditions, preventing a new character from being displayed on the CRT monitor 1 until a predetermined point on the screen is reached.

An equality detector 98, a conventional comparator circuit, compres the value of the tab counter 42 with the value of the tab register 40 to determine whether or not these values are equal. When the two registers 40 and 42 contain the same value, the flip-flop 99 is set to enable the width counter 90. The tab counter 42 has as inputs a bit clock/two signal and synchronizing signal, horizontal blank. The counter 42 increments on the clock/two signal and gets cleared to zero with the horizontal blank signal.

The tab function is thus implemented. Briefly stated, when a tab value is loaded from the buffer 50, processing of characters is halted until the state of the tab counter 42 is incremented to the same value as the new state of the tab register 40. When this equality takes place, the processing of characters is initiated. The usual tab function, in this preferred embodiment, is to direct the information or characters with respect to predetermined or selected points (tab value) on the monitor screen. This function could be termed tabbing to some point to the monitor screen.

The tab function may even be used to start the display of information on a new line by loading the tab register 40 with a small value such that an equality is not reached. Even though the tab counter 42 continues to be incremented, the H blank signal occurs first clearing the counter 42 thereby setting it to zero. Then, the tab counter 42 starts incrementing again to reach an equality, depending upon the value in the tab register 40. When the equality is reached and processing begins, the video output will be displayed at the beginning of the next scan line.

The tab function may also be used to stop processing for the entire monitor screen by placing a large value, such as 255, in the tab register 40. The tab counter 42 is thereby always cleared to zero by the H blank signal and will never reach the value in the register 40. Processing does not take place because the enable flip-flop 99 is always reset during this condition. Processing of a new page may be achieved by inputting a vertical blank signal into the tab register 40 and clearing it to zero. Then, processing will start on the next horizontal blank signal which clears the tab counter 42 to continue the processing of characters.

The width counter 90 is decremented and the video shift register 92 is shifted in accordance with a clock output from a variable oscillator 100. The register 92 is always shifted in accordance with this pulse train; whereas the counter 90 is only decremented when it is enabled by setting the flip-flop 99. The oscillator 100 may be implemented by a conventional oscillator, although one especially suitable for this preferred embodiment is described in U.S. Pat. application, Ser. No. 418,507 filed Nov. 23, 1973, and assigned to the assignee of the present invention.

The character generator 10 contains a variable oscillator 100 for a bit clock. The bit clock signal provides the timing for shifting out new video information in serial stream for display on each scan line of the monitor screen. The variable oscillator 100 is loaded with a value from a bits/line register 102. This value represents the number of bits that is desired for each scan line and is stored in the register 102 under the control of the computer 12. The oscillator 100 also has as an input the horizontal blank signal for synchronization and is set to whatever frequency determines the correct number of bits to be shifted out for each scan line, thus providing the desired aspect ratio for the characters to be displayed. The output of the oscillator 100 labeled clock is fed directly to a divide by two element 106 which provides a clock/two signal. The clock/two signal is processed through a scaling element 108 and used as a signal to control various processing elements shown in FIG. 5, including counting in the width counter 90 and shifting signals out of the video shift register 92.

The scaling element 108 provides horizontal scaling for the character being processed if the display list has indicated that it is to be provided during processing. A bit from the mode register 94 is inputted to the element 108 to allow only every other clock pulse of the clock/-two signal to be passed to the counter 90 and the register 92. Passing only every other clock pulse will have the effect of causing the width counter 90 to run at half speed thereby causing bits to be shifted out at half speed. Half speed processing produces characters which are twice as wide on the screen. Therefore, horizontal scaling as provided by the element 108 doubles the width of the character. If no control bit is received from the mode register 94, scaling does not take place and the clock/two signal is passed through as an identity.

In addition, clock/two signal goes into cursor control circuits 112 and 114 for the horozontal positioning of the respective cursor which they control. This signal also goes into output shift registers 116 and 118 to control the shifting or loading of these registers.

A composer 124 receives the odd and even video signals generated in parallel from the video shift register 92 and further processes them through to the output register 116 and 118. Another input to the composer 124 is the associated mode information, i.e., high (H) and low (L) intensity signals, from the mode register 94. Still other inputs are from the cursor control circuits 112 and 114, which provide on and off control for the cursor video and intensity signals. Yet another input to the composer 124 is a background signal from a screen mode register 126.

The mode register 126 is loaded from the computer 12 to store three bits of information. One of them is the background information which determines whether black or white video is to serve as the display background. This background information is fed to the composer 126. Another bit indicates external mix. When the external mix signal is fed out to the mixer 14, if external video is selected, this bit determines whether external video only or an added mix of the output of the character generator 10 and external video will be displayed on the monitor 1. The third bit indicates an enable to the character generator 10 itself. By setting this third bit in the register 126, all processing may be stopped to force the screen to be background only.

The composer 124, in processing its inputs, determines for any given video dot to be displayed on the monitor screen what its intensity will be, i.e., background, low intensity, or high intensity. The composer 124 is implemented by parallel decoding nand gates, as disclosed further herein, to represent the following functions: if a cursor is being displayed, then the intensity of the cursor overrides; high intensity cursor forces high intensity over a low intensity cursor; with no cursor being displayed, the video is displayed with whatever intensity is specified; and where video signals are not generated for display, the composer 124 displays the background.

The high intensity signals generated by the composer 124 are inputted to the shift register 116 where upon high intensity video signals are shifted out for display on the monitor screen. The low intensity signals generated by the composer 124 are inputted to the shift register 118 whereupon low intensity video signals are shifted out for display. Each of the registers receives two lines of cideo information, odd and even video respectively. The lines of video are modified on a clock divided by two basis. The clock/two input controls whether parallel loading or shifting occurs with respect to the registers 116 and 118. The direct clock signal is an input to the shift registers 116 and 118 so that they may perform a function of alternately loading and shifting the odd and even video thus serializing the two inputs into the final output. The shift registers 116 and 118 are the only elements in the generator 10 that must run at the bit clock speed.

An additional output, external select, is generated from the character 10 as an input to the video mixer 14. This external select signal is in this preferred embodiment a single bit which provides the selection of either external video or character generator video for display on the monitor 1. The bit is derived from the mode register 94 which is ultimately derived from the contents of the display list program.

Figure 4:
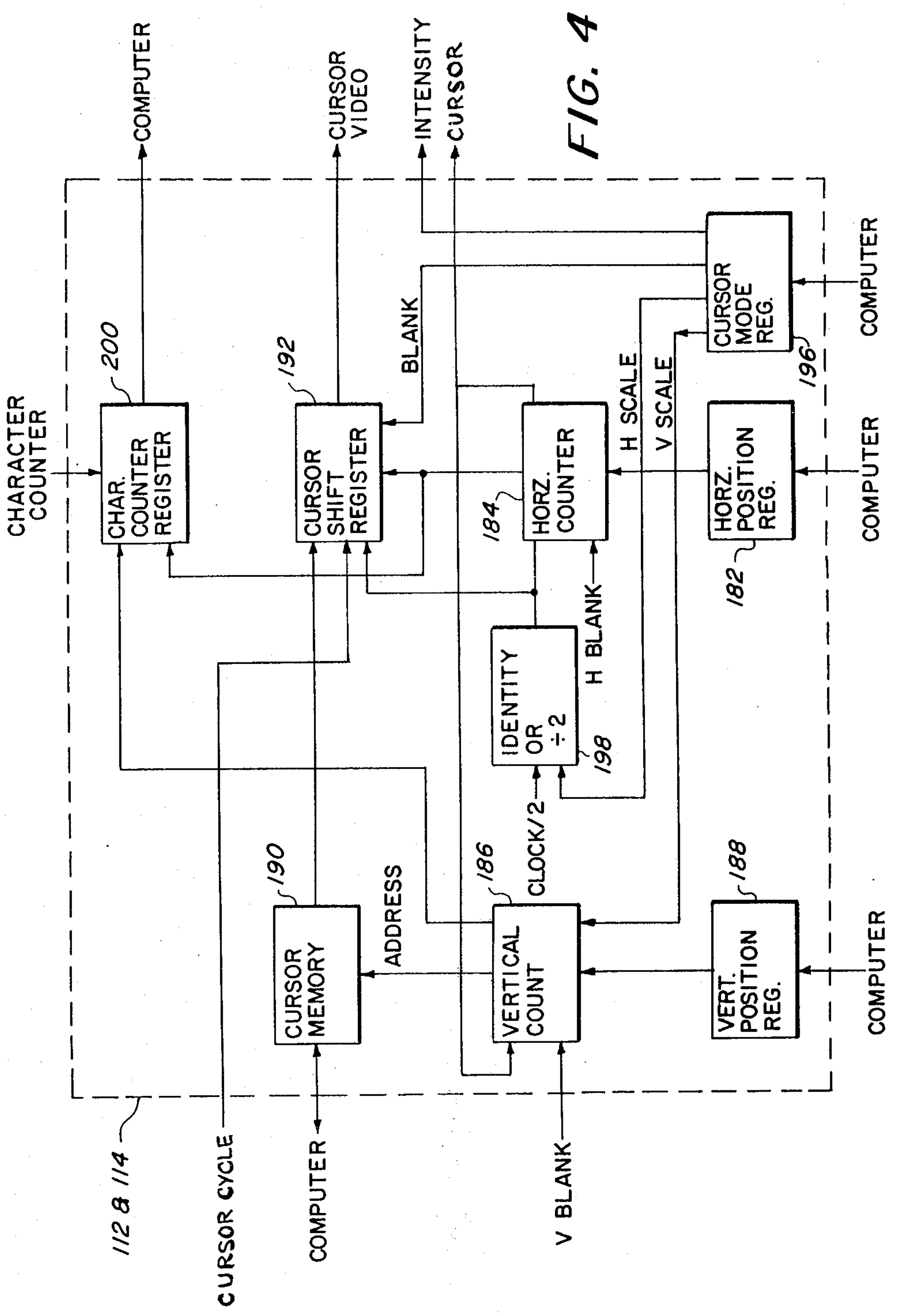
FIG. 4 is a schematic drawing of the cursor control logic which comprises the cursor control device of FIG. 3.

The cursor circuits 112 and 114 are shown in schematic detail in FIG. 4. At the beginning of each scan line as indicated by the horizontal (H) blank signals, contents of a horizontal position register 182 is loaded into a horizontal counter 184. At the beginning of a new screen display as indicated by the vertical (V) blank signal, the value in a vertical position register 188 is loaded into a vertical counter 186. The horizontal counter 184 counts on bit clock/two pulses until it overflows indicating that the horizontal cursor position respective to the circuit has been reached. When the horizontal counter 184 overflows, it in turn causes the vertical counter 186 to increment. These two counters proceed to function until the vertical counter 186 indicates that the vertical position for the cursor has been reached.

When the cursor position has thus been reached, addresses are presented to the cursor memory 190 from the counter 186 and cursor font or video information stored in the memory 190 is loaded into the cursor shift register 192 under the control of the counter 184. When the counter 184 overflows, a signal CURSOR is transmitted to an input terminal of the memory cycle and timing control element 60, shown in FIG. 2, to make a cycle request. The element 60 thereupon generates a signal CURSOR CYCLE which enables the loading of the register 192. As soon as this has occurred, then on the next scan line, when the horizontal position counter 184 overflows, the cursor shift register 192 starts shifting out cursor video information. This function will occur for 32 scan lines as decoded from the state of the vertical counter 186 to cause the video information to be displayed on the screen.

The cursor control logic, as shown in FIGS. 3 & 4, enables the display of cursor-type characters to be positioned randomly over the screen, i.e., its position is not restricted to lines directly over character boundaries as displayed on the screen. The video information which provides the cursor display information is stored in the cursor memory 190. The memoy 190 is 16 bits wide by 32 words. In this preferred embodiment it consists of two memory cells which are part of the overlay memory 28. Of course, the memory 190 may be embodied as a separate and independent memory. The vertical position for the cursor indicates the number of scan lines down from the top of the monitor screen; the horizontal position represents the number of bits timed across the screen. Since the registers 186 and 184 are loaded only with even values, the vertical position is given in even values and the horizontal position is every other bit time.

Mode information for the elements of FIG. 4 are loaded into a cursor mode register 196 from the computer 12. The mode information includes a vertical scale bit which is set to indicate that the cursor is to be twice as high. This bit is an input to the vertical counter 186 which causes it to increment only on every other overflow from the horizontal counter 184 during the time that cursor memory accesses are being generated. Another output of the mode register 196 is a horizontal scale bit. This is the input to an identity or divide by two logic element 198 which takes as its additional input a clock/two signal. For normal cursor display, clock/two is passed through as an identity and fed as a clock input to the horizontal counter 184 and the cursor shift register 192 to clock out their contents. If the horizontal scale bit is set indicating that the cursor is to be displayed twice as wide, then only every other bit of clock/two is passed through to the horizontal counter 184 and the cursor shift register 192.

Another output of the register 196 is blink enable. This will cause the output of the cursor shift register 192 to contain valid information only when the blink oscillator 88 is on. Yet another output of the register 196 is an intensity signal which indicates high or low intensity and is fed as an output from cursor control circuits 112 and 114. The outputs to be received by the composer 124, then, are cursor video odd and even and intensity high or low.

A character count register 200 receives as inputs the value of the character counter 97, the state of the vertical counter 186 and the state of the horizontal counter 184. By the nature of these inputs, during the eighth bit of the sixteenth scan line of the cursor, the register 200 is loaded with a new number from the character counter 97. The current value of the character counter 97 is thus placed in the character count register 200 and made available to the computer 12. This function is to indicate the character count of the character being displayed that lies underneath the cursor according to its current position.

The values in the registers 188 and 182 are loaded from the computer 12. These values represent the XY coordinate positions for the display of a cursor on the screen which has been derived from one of the input devices 3. As described, these values are processed by the cursor control logic shown in FIG. 4 to position the cursor relative to them. In this preferred embodiment, two separate and independent cursors are provided and controlled by the circuits 112 and 114, respectively.

Figure 5A:
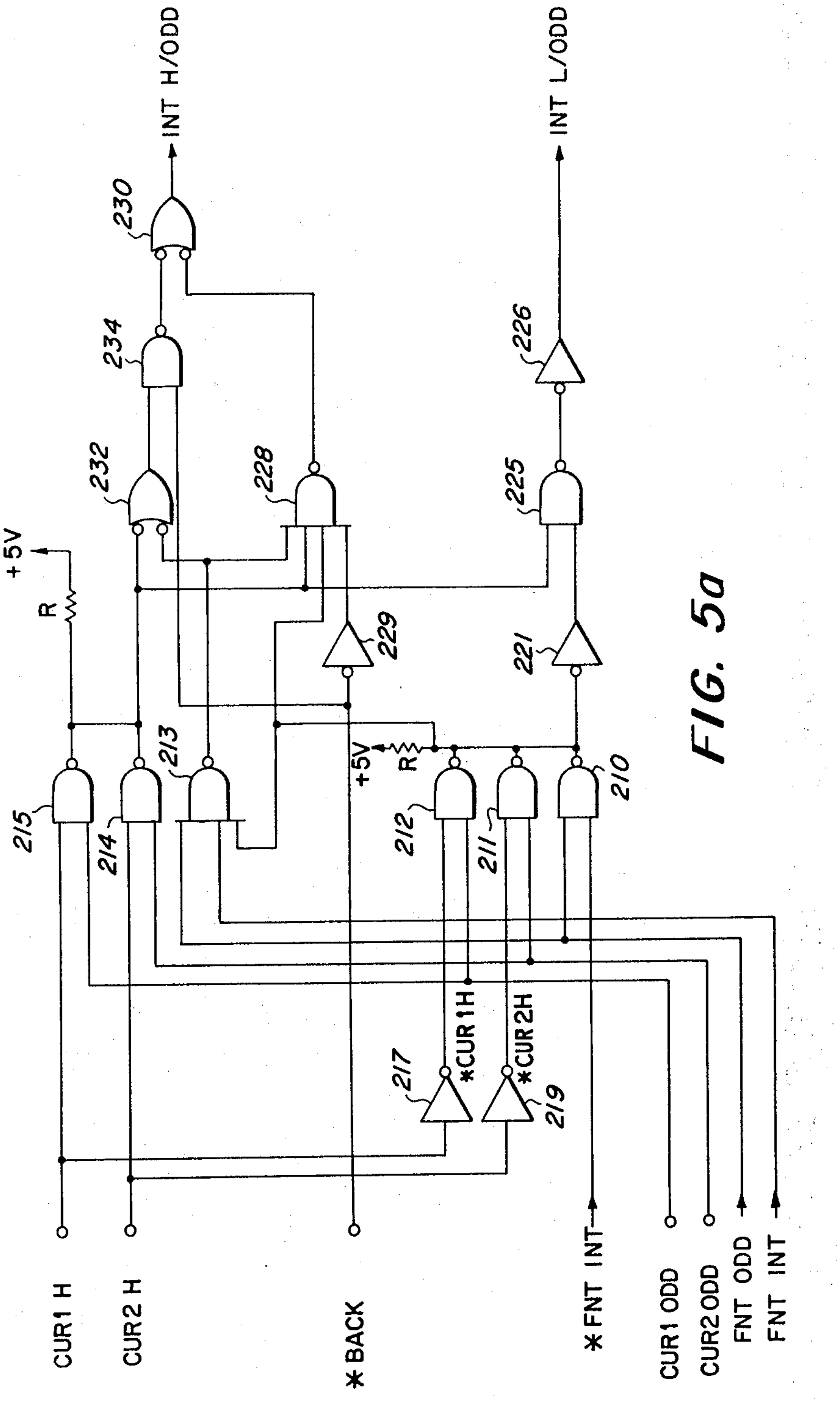
FIGS. 5*a* and *b* are schematic drawings of the composer shown in FIG. 3.
Figure 5B:
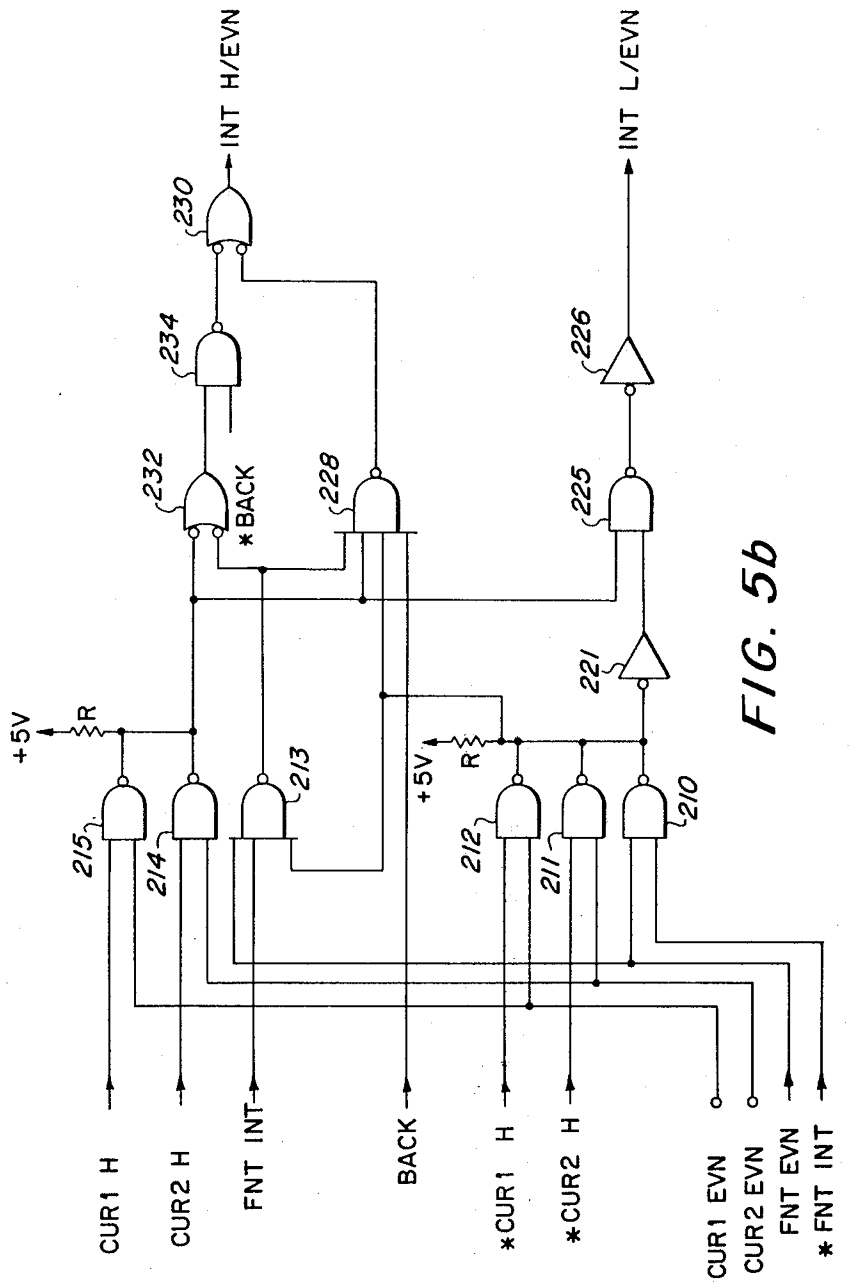

The composer 124 is further shown in FIGS. 5*a* and 5*b*. The odd and even video signals from the shift register 92 and the cursor control elements 112 and 114 are processed separately by the composer circuits of FIGS. 5*a* and 5*b*, respectively. The odd and even video signals to the composer 124 are actually carried on separate lines to these respective circuits constituting the composer 124. In FIG. 5*a* the video odd signal from the shift register 92 is shown as FNT ODD: whereas in FIG. 5*b* the respective input in FNT EVN for the video even signal. The video signals from the cursor control elements 112 (CUR 1) and 114 (CUR 2) are similarly processed.

The additional input signals to these circuits are CUR 1 H and CUR 2 H, which are the cursor intensity signals derived from the mode register 196 respective to the elements 112 and 114. The inversions of these signals are * CUR 1 H and * CUR 2 H, respectively. The intensity signal generated from the mode register 94 for the video generated from register 92 is the FNT INT input. This intensity input signal is inverted by an inverter (not shown) to provide another intensity input signal * FNT INT. As previously mentioned a signal denoting the background is generated from the screen mode register 120 to the composer 124. This input is labeled BACK; its inversion is * BACK.

The input signals respective to each of the circuits are processed by a configuration of NAND gates 210–215. Inverters 217 and 219 in FIG. 5*a* provides the signals * CUR 1 H and * CUR 2 H. The font associated inputs are gated through the NAND gates 210 and 212 to provide the INT H and INT L output signals, respectively, depending upon the logical connections shown in FIGS. 5*a* and 5*b*. The cursor associated inputs are gated by NAND gates 211, 212, 214 and 215.

The outputs of the NAND gates 210–212 are connected in parallel and inverted by an inverter 221 to provide an input signal to a NAND gate 225, whose output depends upon the logical state of the parallel connected outputs of the NAND gates 214 and 215, as well. The output of the gate 225 is inverted by the inverter 226 to provide the INT L signal.

The background signal is an input to a NAND gate 228. In FIG. 5*a* it is provided by inverting * BACK by an inverter 229. This input is combined with the additional three inputs shown to provide an output which is connected as an input to an OR gate 230 to provide the INT H signal. This INT H signal may also be provided by the coupling of either of the inputs to an OR gate 232 with the signal * BACK by the NAND gate 234. The output of the gate 234 is gated through OR gate 230 to provide the INT H output signal.

The output signals from the composer 124 are processed by the shift registers 116 and 118 to provide the video high and low intensity signals which are fed to the video mixer 14 in the form of logic levels on two separate lines. In the mixer 14 these logic levels, e.g., 0 to 5 volts, are converted into TV video voltage levels, e.g. 0 to 1 volt, which are suitable as an input to the CRT monitor 1.

The output buffer 50 and the identity or divide by two elements 108 and 109 are embodied as disclosed in U.S. Pat. application Ser. No. 418,508, filed Nov. 23, 1973 and assigned to the assignee of the present invention, which fully describes a display system in which the present invention may be utilized.

One of the alternatives for display is to select an external video source, e.g. the T.V. camera 16, to be displayed in place of output from the character generator 10. By placing control for selecting the video source within the display list program, overlays and screen partitioning can be achieved. For example, a picture can be displayed with the character generator 10 selected in places to display labels and/or titles, or arbitrary areas can be used for display of external video while the remaining area used for text from the character. This feature is implemented as alluded to earlier in the specification and as shown in FIG. 3 by placing a mode change instruction between the display characters in the display list which is utilized by the mode register 94 to control the video processing. The external select signal from the mode register 94 is thus utilized when received by the mixer 14. An analog switch within the mixer 14 is controlled by this signal to determine whether external video or character generator video is sent to the monitor 1.

The video mixer 14 may be any conventional video mixer capable of performing these functions. The mixer device contemplated in this preferred embodiment, however, is that disclosed in U.S. Pat. application Ser. No. 418,506, filed on Nov. 23, 1973 and assigned to the assignee of the present invention.

Generation of high quality video information for display on high resolution T.V. systems requires digital processing which "pushes" the speed of integrated circuits currently available. While the required speed of 40 MHZ can be achieved with available components, they are significantly more expensive and take up more space. The invention overcomes this difficulty by processing the odd and even video bits separately and simultaneously, as shown in FIGS. 3 and 4. The video output is derived from a 16-bit computer word where the individual bits are labeled 0, 1, 2, . . . 14, 15 and are presented to the output in sequence, bits 0, 1, 2, . . . 14, 15 at a 40 MHZ rate. Internally, however, one shift register presents bits 0, 2, 4, . . . 12, 14. while the other presents bits 1, 3, 5, . . . 13, 15, both at a 20 MHZ rate. This also allows any other control logic, such as the width counter 90 to operate at 20 MHZ. The only restriction in this approach is that the character widths must be even values only.

The video is produced by synchronously extracting words from the output buffer 50. These words contain the character description, intensity and video mixing information. The output buffer 50, though, is loaded asynchronously with words from the font memory 20, which describes the characters to be displayed. The basic cycle time for the system as described herein is 220ns, which time is set by the speed of the memory devices used for the display list and font memories 34 and 20. With the organization of elements as described, the maximum video output rate is 40 MHZ, or one dot every 25ns. To simplify the combination of elements following the buffer 50, characters have a defined width consisting of an even number of dots.

It has been assumed in this description of the preferred embodiment that the binary coded data to be processed is stored in the memories and registers of this system. As implied earlier in the specification, though, the computer may initially write all of the stored information into the system by conventional interfacing with these elements. The function of the computer in either situation is to provide an interface between the display system described herein and processors which utilize the display system. Of course, each of the processors may choose to select a differing text on the display screen or even different fonts of characters, such as Roman, bold face, and italic, in differing sizes. Also, each processor may want to define its own character set and to operate as though it had a display screen of its own.

The controlling computer would have a library of fonts stored on a small disc. The representation of a sub-font may be specified either (1) by keyboard commands to the controlling computer which call out representations from the library in case the processor using the terminal is not equipped for fonts; (2) by similar commands from the processor in case the processor is equipped to handle fonts but has no representations of its own; or (3) by explicit specification of dot matrices from the processor.

Obviously, many modifications of the present invention are possible in light of the above teaching and, of course, the present invention may be used in other display systems than described herein. For example, the output signals from the cursor could be gated through the symbol generator disclosed in U.S. Pat. No. 3,528,068 to a linear scan video display device. It is therefore to be understood that, in the scope of the appended claims, the invention may be practiced other than as specifically described.

What is claimed is:

1. A controller for generating signals which provide for a cursor at a predetermined position on a display screen, comprising first counting means for synchronously generating first positional signals representing a first positional coordinate for locating the cursor at a first respective position on the display screen, said first counting means including means for providing an overload signal indicative of the value of the positional signals being greater than the value of said first positional coordinate at said first respective position, second counting means responsive to said overload signal from said first counting means after said first position is reached for synchronously generating second positional signals representing a second positional coordinate for locating the cursor at the first position and a second respective position on display screen, and means responsive to said positional signals for generating cursor video signals such that the cursor is displayed at the predetermined position on said display screen.

2. The controller as defined in claim 1 in which said cursor video generating means includes a memory means for storing cursor video information, said memory means being responsive to said second positional signals, and shift register means responsive to said first positional and overload signals from said first counting means to load said video information and to generate the cursor video signals with respect to said positional signals.

3. The controller as defined in claim 1 wherein is further included means for scaling the first and second positional signals.

4. The controller as defined in claim 1 wherein is further included register means for storing predetermined first and second predetermined coordinate positions for the display of the cursor and wherein said first counting means is responsive to said register means for receiving the first coordinate and said second counting means is responsive to said register means for receiving the second coordinates.

5. The controller as defined in claim 4 wherein said register means is comprised of first and second register means for storing said first and second coordinates, respectively, said first and second register means corresponding to said first and second counting means, respectively.

6. The controller as defined in claim 1 wherein said first and second positional coordinates are horizontal and vertical positional coordinates, respectively.

7. A controller for generating signals which provide for a cursor at a predetermined position on a display screen, comprising:

first counting means for synchronously generating horizontal positional signals for said cursor until a predetermined horizontal cursor position is reached on said display screen, said first counting means including means for providing an overload signal indicative of the value of the positional signals being greater than the value of said predetermined horizontal cursor position, second counting means responsive to said overload signal from said first counting means after said horizontal cursor position is reached for synchronously generating vertical positional signals for said cursor and until a predetermined vertical cursor position is reached on said display screen, and means responsive to said positional signals for generating cursor video signals such that the cursor is displayed at the predetermined position on said display screen.

8. The controller as defined in claim 7 in which said cursor video generating means includes a memory means for storing cursor video information, said memory means being responsive to said vertical positional signals, and shift register means responsive to the positional and overload signals from said first counting means to load said video information and signals with respect to said positional signals.

9. The controller as defined in claim 7 wherein is further included means for scaling the horizontal and vertical positional signals.

10. The controller as defined in claim 7 wherein is further included register means for storing predetermined horizontal and vertical coordinate positions for the display of the cursor and wherein said first counting means is responsive to said register means for receiving the horizontal coordinate and said second counting means is responsive to said register means for receiving the vertical coordinate.

11. The controller as defined in claim 10 wherein said register means is comprised of first and second register means for storing said horizontal and vertical coordinates, respectively, said first and second register means corresponding to said first and second counting means, respectively.

12. The controller as defined in claim 1 wherein said cursor video generating means includes logic means for enabling the display of cursor-type characters to be randomly positioned on said display screen.

13. The controller as defined in claim 7 wherein said cursor video generating means includes logic means for enabling the display of cursor-type characters to be randomly positioned on said display screen.

14. A controller for generating signals which provide for a cursor at a predetermined position on a display screen, comprising first counting means for synchronously generating first positional signals representing a first positional coordinate for locating the cursor at a first respective position on the display screen, said first counting means including means for providing an overload signal indicative of the value of the positional signals being greater than the value of said first positional coordinate at said first respective position, second counting means responsive to said overload signal from said first counting means after said first position is reached for synchronously generating second positional signals representing a second positional coordinate for locating the cursor at the first position and a second respective position on the display screen, and means responsive to said positional signals for generating cursor video signals such that the cursor is displayed at the predetermined position on said display screen, said cursor video generating means including logic means for enabling the display of cursor-type characters to be randomly positioned on said display screen.

15. The input device as defined in claim 14 in which said cursor video generating means further includes a memory means for storing cursor video information, said memory means being responsive to said vertical positional signals, and shift register means responsive to the positional and overload signals from said first counting means to load said video information and signals with respect to said positional signals.

16. The input device as defined in claim 15 wherein is further included means for scaling the horizontal and vertical positional signals.

17. The input device as defined in claim 15 wherein is further included register means for storing predetermined horizontal and vertical coordinate positions for the display of the cursor and wherein said first counting means is responsive to said register means for receiving the horizontal coordinate and said second counting means is responsive to said register means for receiving the vertical coordinate.

18. The input device as defined in claim 17 wherein said register means is comprised of first and second register means for storing said horizontal and vertical coordinates, respectively, said first and second register means corresponding to said first and second counting means, respectively.

* * * * *